US008655834B2

(12) United States Patent
Ahmed et al.

(10) Patent No.: US 8,655,834 B2
(45) Date of Patent: *Feb. 18, 2014

(54) DYNAMICALLY REDIRECTING A TARGET LOCATION DURING A FILE I/O OPERATION

(75) Inventors: Syed A. Ahmed, Austin, TX (US); Jose J. De Jesus, Wellington, FL (US); Shiling Huang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/465,332

(22) Filed: May 7, 2012

(65) Prior Publication Data

US 2012/0221518 A1 Aug. 30, 2012

Related U.S. Application Data

(63) Continuation of application No. 12/399,190, filed on Mar. 6, 2009, now Pat. No. 8,204,854.

(51) Int. Cl.
*G06F 17/30* (2006.01)

(52) U.S. Cl.
USPC .......................................... 707/610; 707/640

(58) Field of Classification Search
None
See application file for complete search history.

(56) References Cited

U.S. PATENT DOCUMENTS

| 6,253,300 | B1 | 6/2001 | Lawrence |
| 6,785,791 | B2 | 8/2004 | Watanabe |
| 7,587,422 | B2 | 9/2009 | Wong et al. |
| 2004/0267752 | A1* | 12/2004 | Wong et al. ........................ 707/9 |
| 2006/0206821 | A1 | 9/2006 | Chien |
| 2010/0199318 | A1* | 8/2010 | Chang et al. ........................ 725/97 |
| 2010/0228709 | A1 | 9/2010 | Ahmed et al. |

FOREIGN PATENT DOCUMENTS

JP 7073078 3/1995

OTHER PUBLICATIONS

"Copy Files to Multiple Folder Locations Software 7.0," Sobolsoft, 2 pages, [online], [retrieved on Nov. 29, 2006]. Retrieved from the Internet: http://www.softpedia.com/get/System/File-Management/Copy-Files-to-Multiple-Folder-Locations-Software.shtml.
Peter Donald, "Ant1.9 Action List," Apache Software Foundation, 10 pages, [online], [retrieved on Jul. 6, 2008]. Retrieved from the Internet: http://svn.apache.org/repos/asf/ant/core/trunk/docs/ant2/actionlist.html.
Office Action, U.S. Appl. No. 12/399,190, filed Mar. 6, 2009, Syed A Ahmed et al, International Business Machines Corporation, mailing date Jul. 5, 2011, 30 pages.
Notice of Allowance, U.S. Appl. No. 12/399,190, filed Mar. 6, 2009, Syed A Ahmed et al, International Business Machines Corporation, mailing date Feb. 13, 2012, 37 pages.

* cited by examiner

*Primary Examiner* — Anteneh Girma
(74) *Attorney, Agent, or Firm* — Matthew W. Baca; Amy J. Pattillo

(57) ABSTRACT

A file I/O operation is initiated to store a result of a file I/O operation in a destination file. In response to the file I/O operation being in progress, an amount of the file I/O operation currently completed is monitored. In response to determining that the amount of the file I/O operation currently completed is less than a threshold amount, another destination file is specified through a user interface, in which to store a result of file I/O operation not yet completed. The file I/O operation stores the remaining result of the file I/O operation at the another destination file. A single file handle is updated for the result of the file I/O operation to reference the destination file comprising the portion of the result and the another destination file comprising the remaining result.

18 Claims, 5 Drawing Sheets

DYNAMICALLY REDIRECTING A TARGET LOCATION DURING A FILE I/O OPERATION

CROSS-REFERENCE TO RELATED APPLICATIONS

This application is a continuation of commonly assigned U.S. patent application Ser. No. 12/399,190, filed Mar. 6, 2009, which is hereby incorporated herein by reference.

BACKGROUND

1. Technical Field

This invention relates in general to the field of computing systems, and more particularly to a method, system, and computer program for dynamically redirecting a target location during a file input/output (I/O) operation.

2. Description of the Related Art

Current operating systems do not allow a user to change the target location of a file I/O operation once the file I/O operation has begun. With the increase in file sizes, such as the large size of audio and video files, a user may spend a significant amount of time waiting for file I/O operations to perform and a user's options for adjusting the target location of a file I/O operation are limited. For example, once a file copy operation is in progress, if the user needs to change the target location for a file being copied, the user either has the option to cancel the copy operation and initiate a new copy operation to copy the file to the new target directory, thus losing the previous time spent copying the file, or the user must wait until the current copy operation is complete and then manually move or copy the copied files to the new target directory, which requires a user to monitor the progress of the copy operation and spend additional time requesting an additional copy operation.

SUMMARY

In one embodiment, a method for specifying a file input/output (I/O) operation destination location while the file I/O operation is in progress is directed to initiating performance of the file I/O operation to store a result of the file I/O operation in a destination file. The method is directed to copying at least a portion of the result of the file I/O operation to the destination file. The method is directed to, in response to the file I/O operation being in progress, determining an amount of the file I/O operation currently completed. The method is directed to, in response to determining that the amount of the file I/O operation currently completed reaches the threshold amount, disabling a selectable option for the user to specify the another destination file while the file I/O operation is not yet completed. The method is directed to, in response to determining that the amount of the file I/O operation currently completed is less than a threshold amount, specifying another destination file at the time the file I/O operation is in progress in which to store the remaining result of the file I/O operation not yet completed. The method is directed to, stopping the copying of the portion of the result of the file I/O operation to the destination file. The method is directed to resuming the performance of the file I/O operation to copy the remaining result of the file I/O operation at the another destination file. The method is directed to updating a single file handle for the result of the file I/O operation to reference the destination file comprising the portion of the result and the another destination file comprising the remaining result, wherein the result of the file I/O operation located at the destination file and the another destination file is accessible through the single file handle.

In one embodiment, a system for specifying a file input/output (I/O) operation destination location while the file I/O operation is in progress comprises one or more processors, one or more data storage units accessible by the one or more processors and a plurality of functional components contained within the data storage units that, when executed by the one or more processors, direct the one or more processors to perform actions of: initiating performance of the file I/O operation to store a result of the file I/O operation in a destination file, copying at least a portion of the result of the file I/O operation to the destination file, in response to the file I/O operation being in progress, determining an amount of the file I/O operation currently completed, in response to determining that the amount of the file I/O operation currently completed reaches the threshold amount, disabling a selectable option for the user to specify the another destination file while the file I/O operation is not yet completed, in response to determining that the amount of the file I/O operation currently completed is less than a threshold amount, specifying another destination file at the time the file I/O operation is in progress in which to store the remaining result of the file I/O operation not yet completed, stopping the copying of the portion of the result of the file I/O operation to the destination file, resuming the performance of the file I/O operation to copy the remaining result of the file I/O operation at the another destination file, and updating a single file handle for the result of the file I/O operation to reference the destination file comprising the portion of the result and the another destination file comprising the remaining result, wherein the result of the file I/O operation located at the destination file and the another destination file is accessible through the single file handle.

In one embodiment, a computer program product for specifying a file input/output (I/O) operation destination while the file I/O operation is in progress comprises one or more computer-readable tangible storage devices. The computer program product comprises prom instructions, stored on at least one of the one or more storage devices, to initiate performance of the file I/O operation to store a result of the file I/O operation in a destination file. The computer program product comprises program instructions, stored on at least one of the one or more storage devices, to copy at least a portion of the result of the file I/O operation to the destination file. The computer program product comprises program instructions, stored on at least one of the one or more storage devices, in response to the file I/O operation being in progress, to determine an amount of the file I/O operation currently completed. The computer program product comprises program instructions, stored on at least one of the one or more storage devices, in response to determining that the amount of the file I/O operation currently completed reaches the threshold amount, disabling a selectable option for the user to specify the another destination file while the file I/O operation is not yet completed. The computer program product comprises program instructions, stored on at least one of the one or more storage devices, in response to determining that the amount of the file I/O operation currently completed is less than a threshold amount, to specify another destination file at the time the file I/O operation is in progress in which to store the remaining result of the file I/O operation not yet completed. The computer program product comprises program instructions, stored on at least one of the one or more storage devices, to stop the copying of the portion of the result of the file I/O operation to the destination file. The computer program product comprises program instructions, stored on at least one of the one or more storage devices, to resume the performance of the file I/O operation to copy the remaining result of the file I/O operation at the another destination file. The computer program product comprises program instructions, stored on at least one of the one or more storage devices, to update a single file handle for the result of the file I/O operation to reference the destination file comprising the portion of the result and the another destination file comprising the remaining result, wherein the result of the file I/O operation located at the destination file and the another destination file is accessible through the single file handle.

An I/O operation listener listens for a user event within an interface displaying a progress of the file I/O operation, where the interface is enabled with an option for a user to specify the another destination file. In response to detecting a user event within the interface, the I/O operation listener reads the another destination file set by the user in the user event. In response to determining that the amount of the file I/O operation currently completed reaches the threshold amount, the I/O operation listener disables the option for a user to specify the another destination file while the file I/O operation is not yet completed.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

Figure 1:
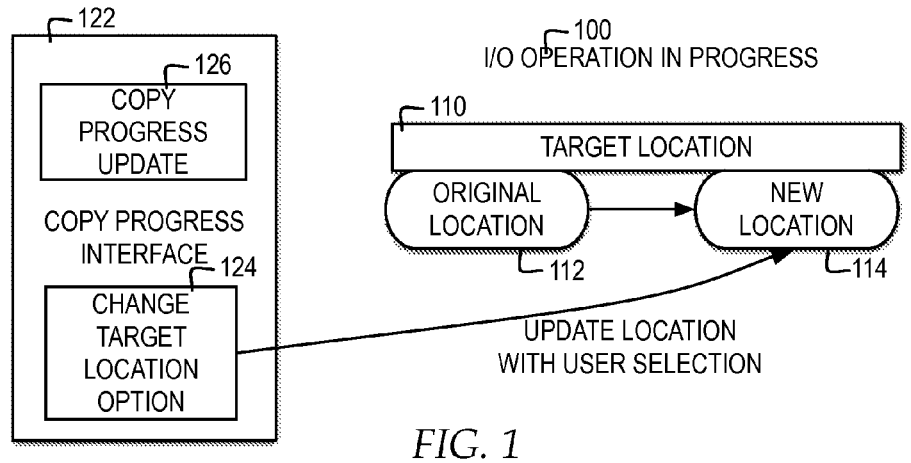
FIG. 1 is a block diagram depicting one embodiment of a user interface for specifying a new target location for a file I/O operation while the file I/O operation is in progress.

Referring now to FIG. 1, a block diagram depicts one embodiment of a user interface for specifying a new target location for a file I/O operation while the file I/O operation is in progress. As illustrated in FIG. 1, for a file I/O operation in progress, as illustrated at reference numeral 100, a target location 110 holds the location set for the file I/O operation. Target location 110 may include one or more of a source location and a destination location representing one or more files, folders or directories of a file system. A file I/O operation represents an operation to perform one or more types of file manipulation within a file system including, but not limited to, copy, move, compress and uncompress, of files, folders, and directories. As referenced herein, a file I/O operation is also referred to as an I/O operation.

In the example, target location 110 is set to original location 112 when the I/O operation starts. While the I/O operation is in progress, an operating system or other module supports a copy progress interface 122. Copy progress interface 122 illustrates a copy progress update 126 indicating a percentage or portion of the I/O operation currently completed. In addition, while the I/O operation is in progress, copy progress interface 120 includes a change destination option 122 for receiving a new location selection from the user.

Upon user entry of a new location through change target location option 124 during the time the I/O operation is being processed target location 110 is updated with the user selection, as illustrated by the dynamic resetting of target location 110 from original location 112 to new location 114. By resetting target location 110 while the I/O operation is in progress and at least a portion of the I/O operation has been performed at original location 112, a user changes the target location for the I/O operation without having to cancel the I/O operation and without having to wait until the I/O operation is complete and then manually select and move the result of the I/O operation to the new target location.

Figure 2:
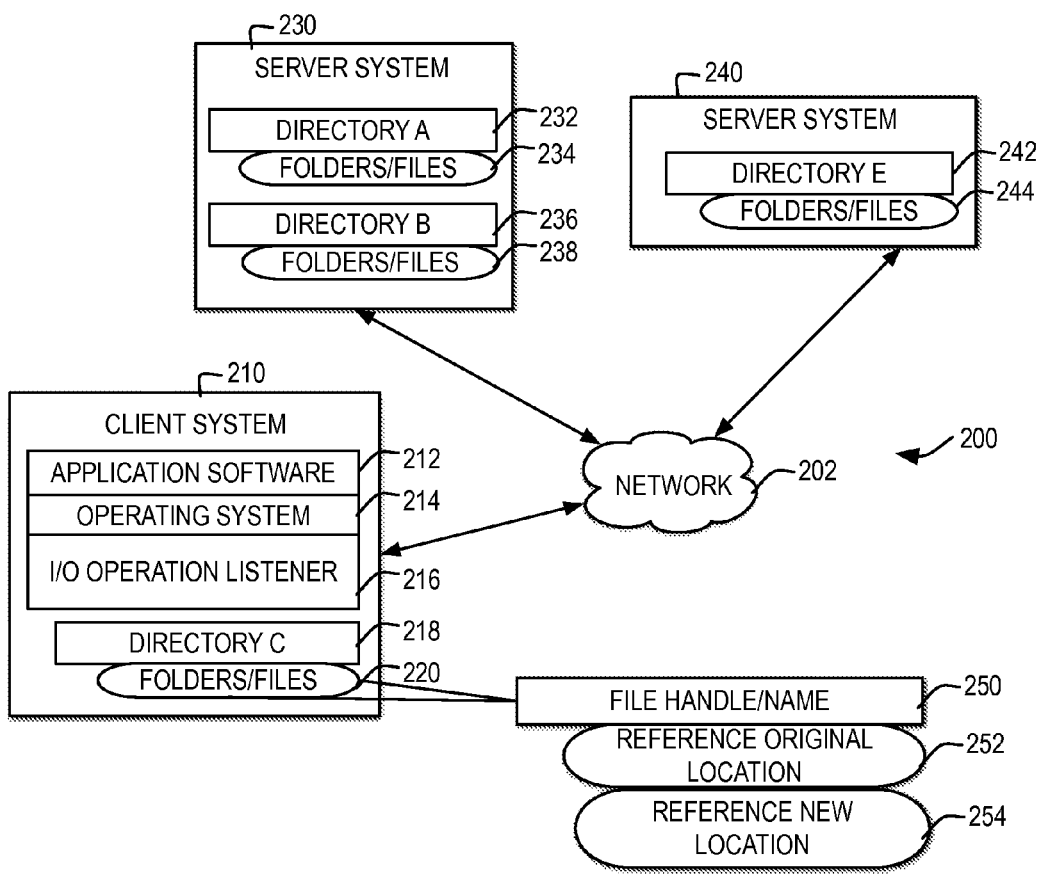
FIG. 2 is a block diagram illustrating one embodiment of network environment for supporting I/O operations in which the user may select a new I/O operation target location while file I/O operation is in progress.

With reference now to FIG. 2, a block diagram illustrates one embodiment of network environment for supporting I/O operations in which the user may select a new file I/O operation target location while the file I/O operation is in progress. In the example, in a distributed environment 200, a network 202 communicatively connects multiple systems, such as client system 210, server system 230, and server system 240. Network 202 may include, but is not limited to, packet-switching networks, such as the Internet or an intranet, and telephony networks, or other network communication mechanisms. In addition, network 202 may include routers, switches, gateways, and other hardware to enable a communication channel between client system 210, server system 230, and server system 240. Further, while in the example client system 210, server system 230, and server system 240 are depicted as communicating via network 202, in an alternate embodiment, one or more of the systems may be incorporated within network 202.

As illustrated in the example, each of client system 210, server system 230 and server system 240 includes one or more data storage system for storing data in an accessible manner. In the example, client system 210 depicts a directory C illustrated at reference numeral 218 that includes data stored in one or more folders and files illustrated at reference numeral 220. In addition, in the example, server system 230 depicts a directory A illustrated at reference numeral 232 that includes data stored in one or more folders and files illustrated at reference numeral 234 and a directory B illustrated at reference numeral 236 that includes one or more folders and files illustrated at reference numeral 238. Further, in the example, server system 240 depicts a directory E illustrated at reference numeral 242 that includes one or more folders and files illustrated at reference numeral 244. It will be understood that additional or alternate data organization structures may be implemented within each of client system 210, server system 230, and server system 240.

As depicted in the example, client system 210 includes application software 212, an operating system 214, and an I/O operation listener 216. I/O operation listener 216 may be a plug-in to any of application software 212, operating system 214, and other modules implemented by client system 210 or I/O operation listener 216 may be a stand-alone module or application. I/O operation listener 216 may also be distributed across one or more systems via network 202 or accessed by client system 210 via network 202.

One or more of application software 212, operating system 214 and other modules accessed by client system 210 perform I/O operations and enable copy progress interface 124 while the I/O operation is in progress. In one example, an I/O operation may include copying a file, folder, or directory from one of server system 230 and server system 240 to client system 210. For example, an I/O operation may include copying a file, folder, or directory from directory A illustrated at reference numeral 232, directory B illustrated at reference numeral 236, or directory E illustrated at reference numeral 242, to directory C illustrated at reference numeral 218. In another example, an I/O operation may include application software 212 controlling a copy operation for copying a file from server system 230 to server system 240. It will be understood that between client system 210, server system 230, server system 240 and other systems within the network, additional and alternate I/O operations may be performed.

In one example, application software 212, operating system 214, or I/O operation listener 216 control display of or enable copy progress interface 122 with copy progress update 126 and change target location option 124. In particular, while an I/O operation is in progress, at least one of application software 212, operating system 214 or I/O operation listener 216 monitor the status of the I/O operation and update copy progress update 126 with the status of the I/O operation.

I/O operation listener 216 listens for user input through change target location option 124. In response to a user input of a requested location through change target location option 124 while an I/O operation is in progress and at least a portion of the I/O operation has been performed at original location 112, I/O operation listener 216 triggers the redirection of target location 110 from original location 112 to the user requested file system location illustrated as new location 114.

Responsive to a change in target location 110, one or more of application software 212, operating system 214, or I/O operation listener 216 automatically redirects the target location for an I/O operation in progress to new location 114. In one example, application software 212, operating system 214, or I/O operation listener 216 responds to the redirected target location for the I/O operation to new location 114 by automatically shifting the target location for the I/O operation to new location 114, such as by automatically pausing the I/O operation process and restarting the I/O operation process to copy the remaining result of the I/O operation at new location 114. As illustrated, once the I/O operation is complete or while the I/O operation is being processed, one or more of application software 212, operating system 214, or I/O operation listener 216 constructs a single file handle or name 250 consisting of the pieces of the I/O operation result stored at original location 112 and new location 114. For example, single file handle or name 250 consists of the pieces of the result of an I/O operation through a reference to a first portion of the result at original location 252 and a reference to a next or remaining portion of the result at the new location 114. By constructing single file handle or name 250 only a single file handle or name is needed for access to the multiple pieces of the I/O operation result In another example, responsive to a change in target location 110, application software 212, operating system 214, or I/O operation listener 216 responds to the redirected target location for the I/O operation to new location 114 by automatically moving a copied item from new location 114 or to new location 114 once the I/O operation to original location 112 is complete.

In yet another example, responsive to a change in target location 110, application software 212, operating system 214, or I/O operation listener 216 may respond to the redirected target location for the I/O operation to new location 114 by stopping storage of the I/O operation results original location 112, generating a copy result file detailing the current results at original location 112, resuming storage of the I/O results at new location 114, merging the results at original location 112 into new location 114 according to the copy result file, and deleting the operation results stored at original location 112.

In one example, I/O operation listener 216 also monitors the status of the I/O operation directly or as reported by application software 212 or operating system 214 and compares a current percentage of the I/O operation completed with a threshold percentage. Once the current percentage of I/O operation completed exceeds the threshold percentage, I/O operation listener 216 disables change target location option 124. I/O operation listener 216 applies at least one threshold percentage set at a percentage less than fully complete and may also apply different threshold percentages dependent upon the type of I/O operation, the estimated time for the I/O operation, and other factors.

Figure 3:
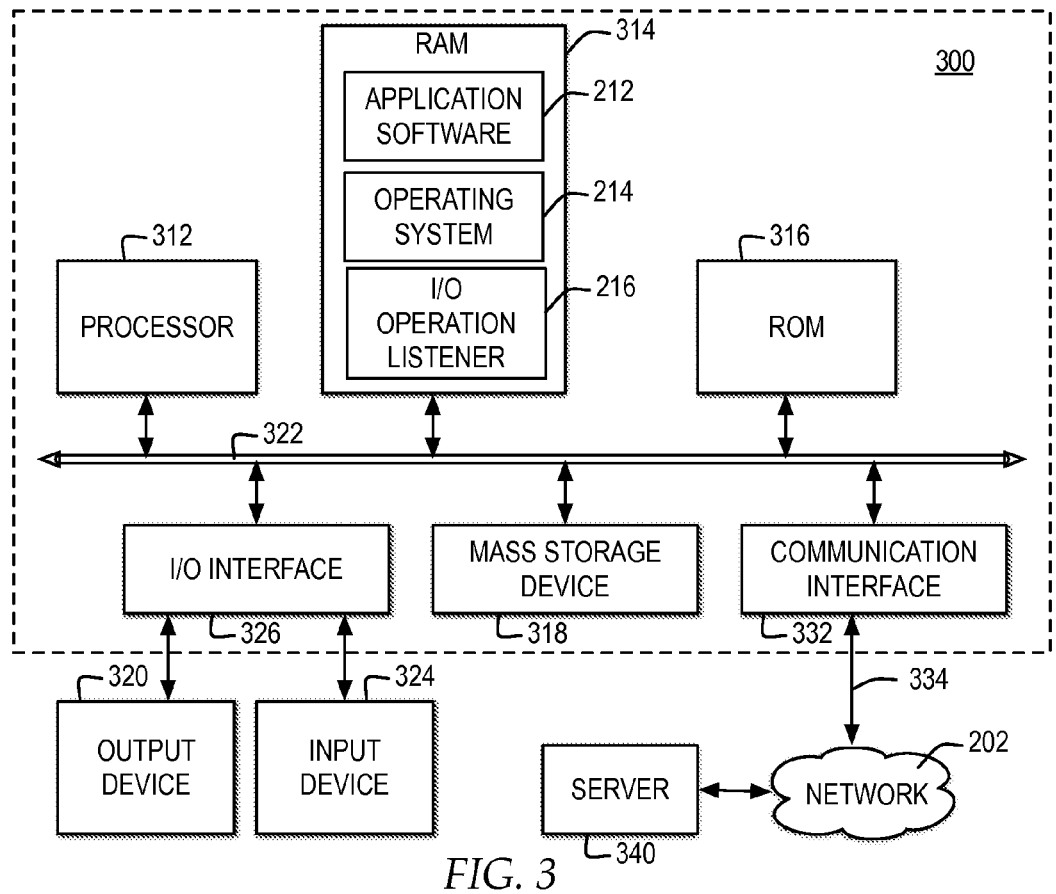
FIG. 3 is a block diagram depicting an example of a computer system in which the invention may be implemented.

With reference now to FIG. 3, a block diagram illustrates an example of a computer system in which the invention may be implemented. Each of client system 210, server system 230, and server system 240 may implement one or more of the functional components described with reference to computer system 300 in FIG. 3. In addition, the invention may be executed in a variety of systems and combinations of systems, made up of functional components, such as the functional components described with reference to computer system 300 and may be communicatively connected to a network, such as network 202.

Computer system 300 includes a bus 322 or other communication device for communicating information within computer system 300, and at least one processing device such as processor 312, coupled to bus 322 for processing information. Bus 322 preferably includes low-latency and higher latency paths that are connected by bridges and adapters and controlled within computer system 300 by multiple bus controllers. When implemented as a server, computer system 300 may include multiple processors designed to improve network servicing power. Where multiple processors share bus 322, additional controllers (not depicted) for managing bus access and locks may be implemented.

Processor 312 may be a general-purpose processor such as IBM's PowerPC (PowerPC is a registered trademark of International Business Machines Corporation) processor that, during normal operation, processes data under the control of an operating system 214, application software 212, I/O operation listener 216, middleware (not depicted), and other code accessible from a dynamic storage device such as random access memory (RAM) 314, a static storage device such as Read Only Memory (ROM) 316, a data storage device, such as mass storage device 318, or other data storage medium. In one embodiment, the operations performed by processor 312 may control dynamic redirection of a target location of an I/O operation while the I/O operation is in progress as depicted in the operations of flowcharts of FIGS. 7 and 8 and other operations described herein. Operations performed by processor 312 may be requested by operating system 360, application software 370, middleware or other code or the steps of the present invention might be performed by specific hardware components that contain hardwired logic for performing the steps, or by any combination of programmed computer components and custom hardware components.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc) or an embodiment containing software and hardware aspects that may all generally be referred to herein as "circuit," "module," or "system." Furthermore, the present invention may take the form of a computer program product embodied on any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, such as mass storage device 318, a random access memory (RAM), such as RAM 314, a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in broadband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, such as computer system 300, partly on the user's computer, as a stand-alone software package, partly on the user's computer and partly on a remote computer or entirely on the remote computer or server, such as a server 340. In the latter scenario, the remote computer may be connected to the user's computer through any type of network, such as network 202, through a communication interface 332 over a network link 334, that may be connected, for example, to network 202 including a local area network (LAN) or a wide area network (WAN), or the connection may be made to an external computer (for example, through the Internet using an Internet Service Provider). Although not depicted, communication interface 332 may include software, such as device drivers, hardware, such as adapters, and other controllers that enable communication. When implemented as a server, computer system 300 may include multiple communication interfaces accessible via multiple peripheral component interconnect (PCI) bus bridges connected to an input/output controller, for example. In this manner, computer system 300 allows connections to multiple clients via multiple separate ports and each port may also support multiple connections to multiple clients.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, such as computer system 300, or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer, such as computer system 300, or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Network link 334 and network 202 both use electrical, electromagnetic, or optical signals that carry digital data streams. The signals through the various networks and the signals on network link 334 and through communication interface 332, which carry the digital data to and from computer system 200, may be forms of carrier waves transporting the information.

In addition, computer system 300 may include multiple peripheral components that facilitate input and output within an interface. These peripheral components are connected to multiple controllers, adapters, and expansion slots, such as input/output (I/O) interface 326, coupled to one of the multiple levels of bus 322. For example, input device 324 may include, for example, a microphone, a video capture device, a body scanning system, a keyboard, a mouse, or other input peripheral device, communicatively enabled on bus 322 via I/O interface 326 controlling inputs. In addition, for example, an output device 320 communicatively enabled on bus 322 via I/O interface 326 for controlling outputs may include, for example, one or more graphical display devices, audio speakers, printers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 3 may vary. Furthermore, those of ordinary skill in the art will appreciate that the depicted example is not meant to imply architectural limitations with respect to the present invention.

Figure 4:
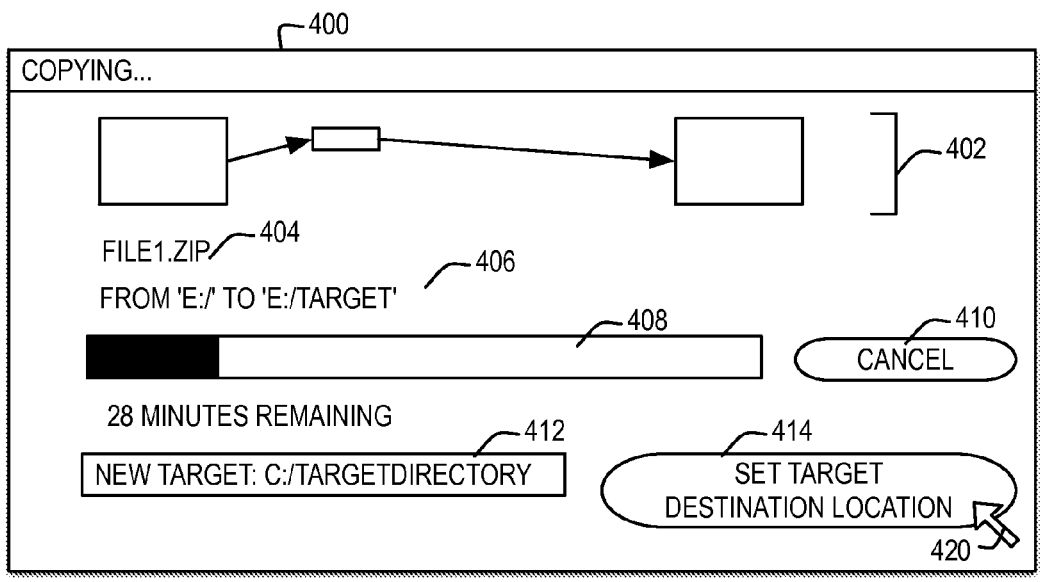
FIG. 4 is a block diagram illustrating a graphical user interface depicting the progress of a file I/O operation and displaying an option for a user to change the target file location of a file I/O operation.

With reference now to FIG. 4, a block diagram illustrates a graphical user interface depicting the progress of a file I/O operation and displaying an option for a user to change the target file location of a file I/O operation. In one example, operating system 214 enables a graphical user interface during a file I/O operation. In the example illustrated, operating system 214 enables display of window 400 to display the progress of a file illustrated as "file1.zip" at reference numeral 404 being copied from an original source file location on an "E-drive" of "E:/" to an original target destination file location on the "E-drive" of "E:/target" as illustrated at reference numeral 406. Window 400 may include a graphical representation that a file copy operation is in progress, such as the graphical representation illustrated at reference numeral 402. In addition, window 400 may include a graphical representation of the progress of the file copy operation, such as the progress of the file copy operation illustrated within a progress bar 408, indicating the percentage of a file copy operation completed and an estimated time remaining for a file copy operation.

In the example, window 400 includes selectable options for a user to change the parameters of the copy operation while the copy operation is in progress. In one example, a user may select a "cancel" selectable option 410 to select to cancel the current copy operation in progress. In another example, a user may select to change the target destination file location for the copy operation while the copy operation is in progress by entering a new target destination file location as illustrated at reference numeral 412 and by selecting a "set target destination directory" selectable option 414. As illustrated, a user may select from selectable options 410 and 414 through placements of a cursor 420 and entry of additional input, however in additional or alternate embodiments, other types of user inputs may trigger selections of selectable options 410 and 420.

In the example, the new target directory destination file location illustrated at reference numeral 412 is set to "C:/targetdirectory", such that upon a user selection of selectable option 420, the target destination file location for the file copy operation in progress is redirected from "E:/target" to "C:/targetdirectory". A user selection of the new target directory file destination location illustrated at reference numeral 412 may include an additional selectable option for a user to open an additional graphical user interface through which a user may search through available directories, folders, and files and select a new target location.

In particular, in the example, I/O operation listener 216 listens for user selections of selectable option 420, and responsive to a user selection of selectable option 420, I/O operation listener 216 changes the parameters of the target file location for the copy operation in progress. In addition, I/O operation listener 216 monitors the progress of a copy operation in progress and when the percentage of the copy operation completed exceeds a threshold percentage, I/O operation listener 216 disables selectable option 420.

While in the example, window 400 includes selectable option 420 for a user to set a new target destination file location, in other embodiments, window 400 may include selectable options for a user to set a new target source file location. In addition, window 400 is adaptable to include additional or alternate selectable options for adjusting the parameters of a copy operation and I/O operation listener 216 is adaptable to listen for additional user inputs within window 400 and to change the parameters of a copy operation with the copy operation is in progress.

Figure 5:
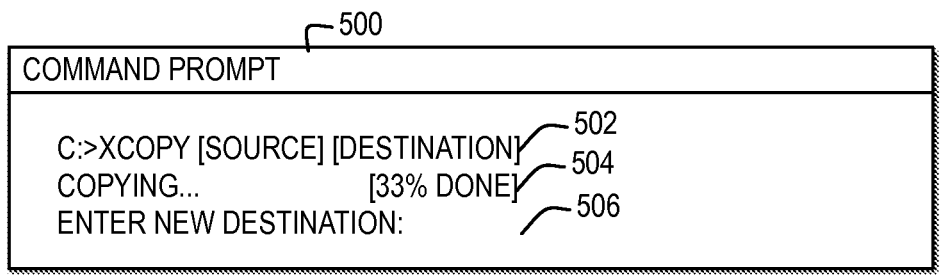
FIG. 5 is a block diagram depicting a command prompt interface depicting the progress of a file I/O operation and facilitating an option for a user to change the target location of a file I/O operation.

Referring now to FIG. 5, a block diagram illustrates a command prompt interface depicting the progress of a file I/O operation and facilitating an option for a user to change the target file location of a file I/O operation. In the example, operating system 214 enables a command prompt interface through which a user specifies a file I/O operation and through which a file I/O operation status is updated.

In the example illustrated in FIG. 5, a command prompt interface 500 includes a first command line 502 specifying the file I/O operation instructions entered by a user. In the example, first command line 502 specifies a command to copy a directory, folder, or file from a "[source]" to a "[destination]", where the user specifies the target source file location of the item to be copied and the target destination file location for the item to be copied.

In addition, in the example illustrated in FIG. 5, command prompt interface 500 includes a second command line 504 specifying "copying . . ." to indicate that a copy operation is in progress and "[33% done]" to indicate a percentage of the copy operation already completed. In other examples, other indicators of a copy operation progress may be updated in second command line 504 while a copy operation is in progress.

Further, in the example illustrated in FIG. 5, command prompt interface 500 includes a third command line 506 through which a user may enter a new destination file location for the copy operation while the copy operation is in progress. In particular, in the example, I/O operation listener 216 listens for user entry of a new destination file location at the prompt on third command line 506, and responsive to a user entry of a new destination file location, I/O operation listener 216 changes the parameters of the target location for the copy operation in progress.

Figure 6:
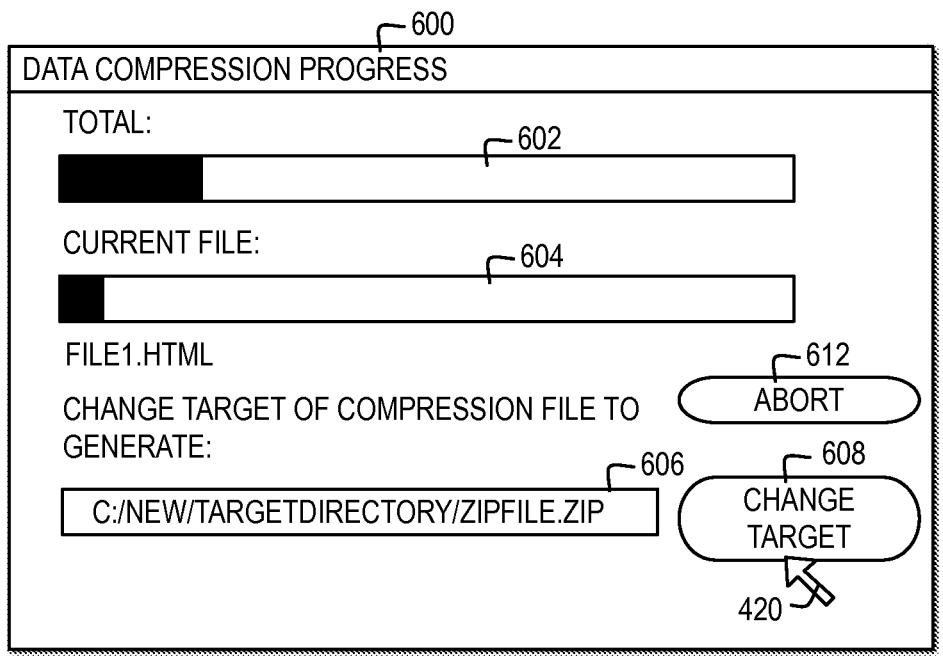
FIG. 6 is a block diagram illustrating a data compression interface depicting the progress of a data compression operation.

With reference now to FIG. 6, a block diagram illustrates a data compression interface depicting the progress of a data compression operation. In the example, a data compression progress window 600 provides a graphical user interface for informing a user of the progress of a data compression operation and for providing a user with selectable options to change the parameters of the data compression operation. In the example, the data compression operation is an example of an I/O operation. Any of application software 212, operating system 214, and I/O operation listener 216 may provide the controller for performing the data compression operation.

As illustrated in the example in FIG. 6, a first progress bar 602 depicts the progress status of the compression, where a data compression operation includes compressing one or more files into a compressed file stored at a target location directory. A second progress bar 604 depicts the progress status of the compression of a particular file being compressed. It will be understood that data compression progress window 600 may include additional or alternate illustrative representations of the progress of a data compression operation.

In addition, as illustrated in the example in FIG. 6, data compression progress window 600 includes a selectable field 606 enabled for a user to specify a new target directory or target file name for the compressed file being generated, while a data compression operation is in progress. In the example, the user has entered a new target file name for the compressed file being generated during the data compression process of "C:/NEW/TARGETDIRECTORY/ZIP- FILE.ZIP". A user may select to change the target destination directory for the compressed data operation by selection of a "change target" selectable option 606 through placement of cursor 420 or other input options. Additionally, a user may select to cancel the data compression operation through selection of an "abort" selectable option 612.

In particular, in the example, I/O operation listener 216 listens for user selections of selectable option 608, and responsive to a user selection of selectable option 608, I/O operation listener 216 changes the parameters of the target directory location for the data compression file in progress. In addition, I/O operation listener 216 monitors the progress of a data compression operation in progress and when the percentage of the data compression operation completed exceeds a threshold percentage, I/O operation listener 216 disables selectable option 608.

It is important to note that in the example in FIG. 6, when a user selects a new target directory location while the data compression operation is in progress, moving the data compression file to a new target directory location on a same drive only requires a move operation, however moving the data compression file to a new target directory on a different drive requires a copy operation.

In one example, when the data compression operation controller detects a new target location on a different drive during a data compression operation, the data compression operation will immediately start generating the files and directories remaining for the data compression operation at the new target directory location. In addition, the data compression operation controller will make a copy record of the information about the portion of the data compression already performed at the original target location directory including, but not limited to, which files and directories are already copied to the original target location directory, which files and directories have been partially generated at the original target location directory, and the name of the original target location directory. If a user selects to change the target location directory for the data compression operation additional times while the data compression operation is in progress, a copy record is made for each previous location. Once the data compression operation controller finishes generating the files and directories for compression, the data compression operation controller sorts through all copy records and merges the files and directories from the original target location directory to the new target location directory. For files completed at the original target location directory, the data compression operation controller copies the files to the new target location directory and deletes the files from the original target location directory. For files partially copied to the original target location directory, the data compression operation controller copies the partial data from the original target location directory and reconstructs the files on the new target location directory.

Figure 7:
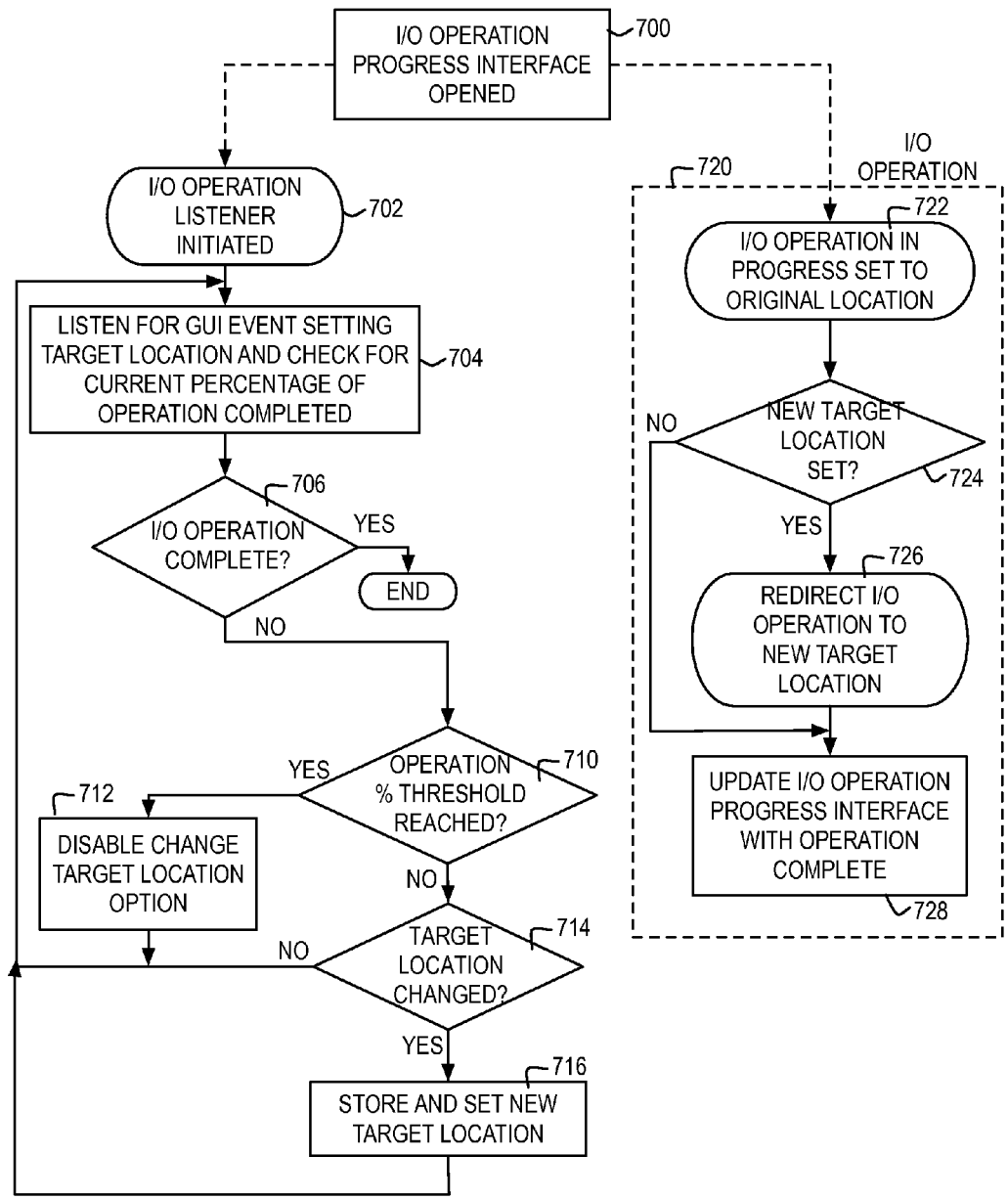
FIG. 7 is a high level logic flowchart depicting a process and program for dynamically changing a target location of an I/O operation while the I/O operation is in progress.

Referring now to FIG. 7, a high level logic flowchart depicts a process and program for dynamically changing a target location of an I/O operation while the I/O operation is in progress.

In the example, when an I/O operation progress interface is opened, as illustrated at block 700, the process performed by I/O operation listener 216 is triggered, as illustrated at reference numeral 702. As illustrated at block 704, I/O operation listener 216 listens for a GUI event setting a new target location and checks or monitors the current percentage of the I/O operation completed.

While listening, block 706 illustrates a determination whether the current percentage of the operation completed indicates the I/O operation is complete. If the I/O operation is not yet complete, then the process passes to block 710. Block 710 illustrates a determination whether the current percentage of the operation completed has reached the percentage threshold. If the current percentage of the operation completed has reached the percentage threshold, then the process passes to block 712. Block 712 depicts disabling the change target location option in the I/O operation copy progress interface and continuing at block 704 to check for the current percentage of the operation completed. Otherwise, at block 710, if the current percentage of the operation completed has not reached the percentage threshold, then the process passes to block 714.

Block 714 depicts a determination whether a GUI event indicates a target location change. If there is not a GUI event indicating a target location change, then the process continues at block 704. If a GUI event indicates a target location change, then the process passes to block 716. Block 716 illustrates storing and setting the new target location, and the process continues at block 704.

Referring back to block 700, in association with an I/O operation progress interface opened, an I/O operation process is performed, whether by application software 212, operating system 214, or I/O operation listener 216, as referenced at reference numeral 720. In the example, as illustrated at block 722, in correlation with an opened I/O operation progress interface, an I/O operation is in progress set to the original target location. Next, as depicted at block 724, a determination is made whether a new target location is set. In one example, when the I/O operation to the original target location is completed, then the I/O operation may read the target location data stored at block 716 to detect whether a new target location is set. In another example, the I/O operation listener process may trigger the I/O operation to detect that a new target location has been set when the new target location is set or when the original I/O operation is complete.

If at block 724 a determination is made that a new target location is set, then the process passes to block 726. Block 726 depicts redirecting the I/O operation to the new target location, and the process passes to block 728. In one example, the I/O operation redirects the I/O operation to the new target location by moving or copying the newly copied data to the new target location. In another example, the I/O operation redirects the I/O operation to the new target location by immediately starting the I/O operation at the new target location. Block 728 illustrates updating the I/O operation progress interface with an indicator that the operation is complete. Returning to block 724, if a determination is made that no new target location is set, then the process passes to block 728.

With reference to the I/O operation process described with reference to FIG. 720 and with reference to the opened I/O operation progress interface 700, it is important to note that additional processes may be performed in order to implement additional steps in the I/O operation process and in order to implement the I/O operation progress interface.

Figure 8:
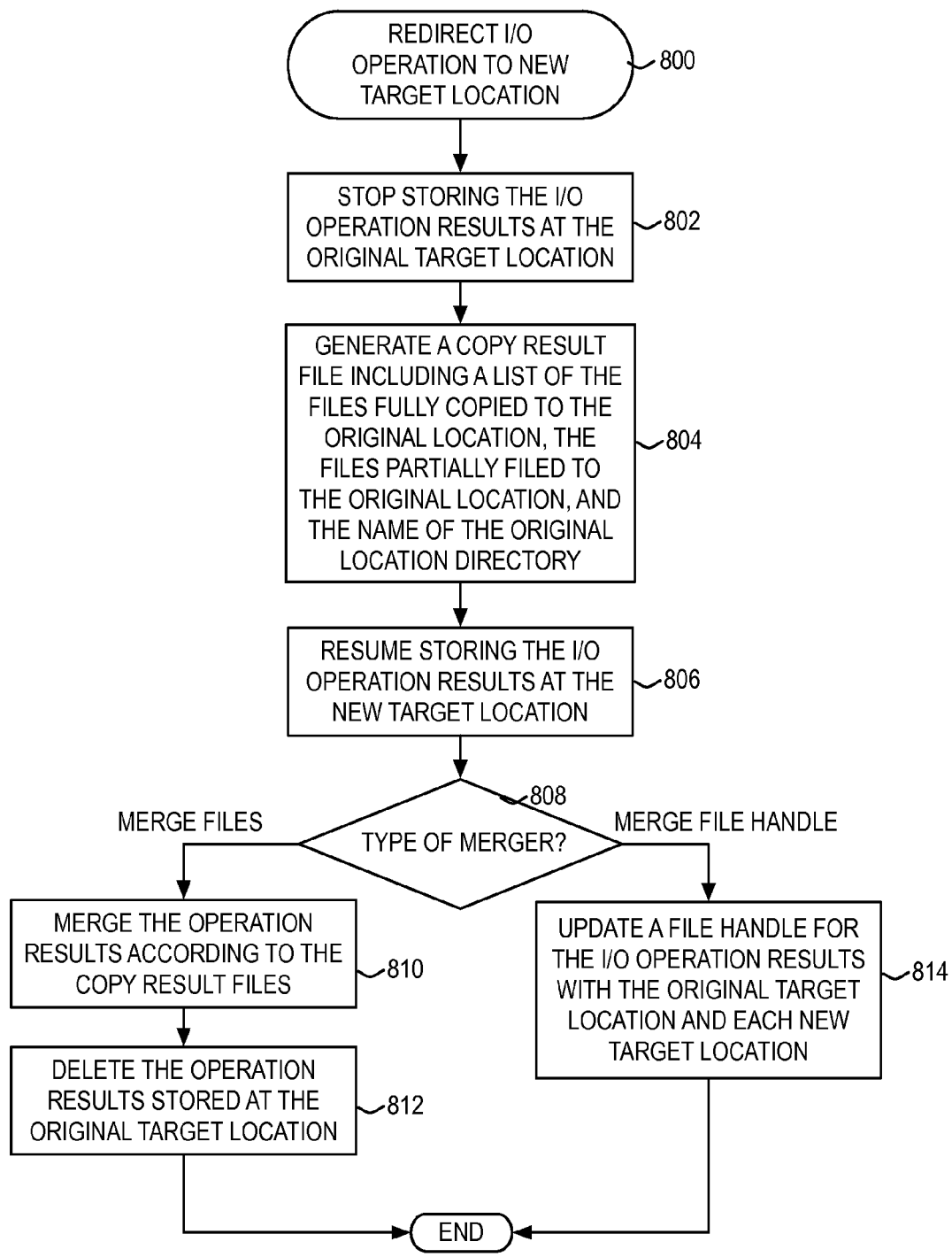
FIG. 8 is a high level logic flowchart illustrating a process and program for redirecting an I/O operation to store a result at a new target location while the I/O operation is in progress.

With reference now to FIG. 8, a high level logic flowchart depicts a process and program for redirecting an I/O operation to store a result at a new target location while the I/O operation is in progress. In the example, the process for redirecting an I/O operation to store a result at a new target location starts at block 800 and thereafter proceeds to block 802. The example triggered at block 800 is one example of redirecting the I/O operation to store a result at a new target location, such as when the new target location is on a different drive from the original target location. Block 802 illustrates stopping storage of the I/O operation result at the original target location. Next, block 804 depicts generating a copy result file including a list of the files fully copied to the original location, the files partially filed to the original location, and the name of the original location directory. Thereafter, block 806 illustrates resuming storage of the I/O operation results at the new target location. In one example, resuming storage of the I/O operation result at the new target location includes storing the remaining result of the I/O operation at the new target location which is not included at the original target location and indicating in a file system that a partial result of the file I/O operation is stored at the original target location and the remaining result of the file I/O operation is stored in the new target location. Next, block 808 depicts a determination what type of merger is set for an I/O operation. In one example, a type of merger is set to merge the files themselves and the process passes to block 810. Block 810 depicts merging the operation results according to the copy result files, where a copy result file is made for each previous original location when a user requests a new location. Thereafter, block 812 illustrates deleting the operation results stored at the original target location, and the process ends. Alternatively, at block 808 a type of merger is set to merge the file handle and the process passes to block 814. Block 814 illustrates updating a file handle for the I/O operation results based on the copy result file with a reference to the original target location and a reference to each new target location, and the process ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method for specifying a file input/output (I/O) operation destination location while the file I/O operation is in progress, comprising:
    initiating performance of the file I/O operation to store a result of the file I/O operation in a destination file;
    copying at least a portion of the result of the file I/O operation to the destination file;
    in response to the file I/O operation being in progress, determining an amount of the file I/O operation currently completed;
    in response to determining that the amount of the file I/O operation currently completed reaches the threshold amount, disabling a selectable option for the user to specify the another destination file while the file I/O operation is not yet completed;
    in response to determining that the amount of the file I/O operation currently completed is less than a threshold amount, specifying another destination file at the time the file I/O operation is in progress in which to store the remaining result of the file I/O operation not yet completed;
    stopping the copying of the portion of the result of the file I/O operation to the destination file;
    resuming the performance of the file I/O operation to copy the remaining result of the file I/O operation at the another destination file; and
    updating a single file handle for the result of the file I/O operation to reference the destination file comprising the portion of the result and the another destination file comprising the remaining result, wherein the result of the file I/O operation located at the destination file and the another destination file is accessible through the single file handle.

2. The method according to claim 1, further comprising:
    deleting the portion of the result of the file I/O operation stored at the destination file.

3. The method according to claim 1, wherein resuming the performance of the file I/O operation to copy the remaining result of the file I/O operation in the another destination file comprises:
    storing in the another destination location the remaining result of the file I/O operation which is not included in the destination file; and
    recording that the portion of the result of the file I/O operation is stored in the destination file and that the remaining result of the file I/O operation is stored in the another destination file.

4. The method according to claim 1, wherein resuming the performance of the file I/O operation to copy the remaining result of the file I/O operation in the another destination file comprises:
    moving the result of the file I/O operation when completed at the destination file to the another destination file.

5. The method according to claim 1, further comprising:
    in response to initiating performance of the file I/O operation to store the result of the file I/O operation in the destination file, listening for a user event within an interface displaying a progress of the file I/O operation, wherein the interface is enabled to receive user input of a location for the another destination file; and in response to detecting a user event within the interface of the user specifying the location for the another destination file while the file I/O operation is in progress, setting the location set by the user in the user event as the location for the another destination file.

6. The method according to claim 1, further comprising:
in response to initiating performance of the file I/O operation to store the result of the file I/O operation in the destination file, displaying a selectable option for the user to select to specify the another destination file within a window displaying the amount of the file I/O operation currently completed.

7. The method according to claim 1, wherein initiating performance of the file I/O operation to store a result of the file I/O operation in a destination file further comprises:
performing a file I/O operation for performing a data compression process on a file to reduce a size of the file with the result of the data compression process stored as the destination file.

8. A system for specifying a file input/output (I/O) operation destination location while the file I/O operation is in progress, comprising:
one or more processors;
one or more data storage units accessible by the one or more processors; and
a plurality of functional components contained within the data storage units that, when executed by the one or more processors, direct the one or more processors to perform actions of:
initiating performance of the file I/O operation to store a result of the file I/O operation in a destination file;
copying at least a portion of the result of the file I/O operation to the destination file;
in response to the file I/O operation being in progress, determining an amount of the file I/O operation currently completed;
in response to determining that the amount of the file I/O operation currently completed reaches the threshold amount, disabling a selectable option for the user to specify the another destination file while the file I/O operation is not yet completed;
in response to determining that the amount of the file I/O operation currently completed is less than a threshold amount, specifying another destination file at the time the file I/O operation is in progress in which to store the remaining result of the file I/O operation not yet completed;
stopping the copying of the portion of the result of the file I/O operation to the destination file;
resuming the performance of the file I/O operation to copy the remaining result of the file I/O operation at the another destination file; and
updating a single file handle for the result of the file I/O operation to reference the destination file comprising the portion of the result and the another destination file comprising the remaining result, wherein the result of the file I/O operation located at the destination file and the another destination file is accessible through the single file handle.

9. The system according to claim 8, wherein the plurality of functional components contained within the data storage unit that, when executed by the one or more processors, direct the one or more processors to further perform the action of deleting the portion of the result of the file I/O operation stored at the destination file.

10. The system according to claim 8, wherein the plurality of functional components contained within the data storage unit that, when executed by the one or more processors, direct the one or more processors to further perform the actions of:
storing in the another destination location the remaining result of the file I/O operation which is not included in the destination file; and
recording that the portion of the result of the file I/O operation is stored in the destination file and that the remaining result of the file I/O operation is stored in the another destination file.

11. The system according to claim 8, wherein the plurality of functional components contained within the data storage unit that, when executed by the one or more processors, direct the one or more processors to further perform the action of moving the result of the file I/O operation when completed at the destination file to the another destination file.

12. The system according to claim 8, wherein the plurality of functional components contained within the data storage unit that, when executed by the one or more processors, direct the one or more processors to further perform the actions of:
in response to initiating performance of the file I/O operation to store the result of the file I/O operation in the destination file, listening for a user event within an interface displaying a progress of the file I/O operation, wherein the interface is enabled to receive user input of a location for the another destination file; and
in response to detecting a user event within the interface of the user specifying the location for the another destination file while the file I/O operation is in progress, setting the location set by the user in the user event as the location for the another destination file.

13. The system according to claim 8, wherein the plurality of functional components contained within the data storage unit that, when executed by the one or more processors, direct the one or more processors to further perform the action of in response to initiating performance of the file I/O operation to store the result of the file I/O operation in the destination file, displaying a selectable option for the user to select to specify the another destination file within a window displaying the amount of the file I/O operation currently completed.

14. The system according to claim 8, wherein the plurality of functional components contained within the data storage unit that, when executed by the one or more processors, direct the one or more processors to further perform the action of performing a file I/O operation for performing a data compression process on a file to reduce a size of the file with the result of the data compression process stored as the destination file.

15. A computer program product for specifying a file input/output (I/O) operation destination while the file I/O operation is in progress, the computer program product comprising:
one or more computer-readable tangible storage devices;
program instructions, stored on at least one of the one or more storage devices, to initiate performance of the file I/O operation to store a result of the file I/O operation in a destination file;
program instructions, stored on at least one of the one or more storage devices, to copy at least a portion of the result of the file I/O operation to the destination file;
program instructions, stored on at least one of the one or more storage devices, in response to the file I/O operation being in progress, to determine an amount of the file I/O operation currently completed;

program instructions, stored on at least one of the one or more storage devices, in response to determining that the amount of the file I/O operation currently completed reaches the threshold amount, disabling a selectable option for the user to specify the another destination file while the file I/O operation is not yet completed;

program instructions, stored on at least one of the one or more storage devices, in response to determining that the amount of the file I/O operation currently completed is less than a threshold amount, to specify another destination file at the time the file I/O operation is in progress in which to store the remaining result of the file I/O operation not yet completed;

program instructions, stored on at least one of the one or more storage devices, to stop the copying of the portion of the result of the file I/O operation to the destination file;

program instructions, stored on at least one of the one or more storage devices, to resume the performance of the file I/O operation to copy the remaining result of the file I/O operation at the another destination file; and program instructions, stored on at least one of the one or more storage devices, to update a single file handle for the result of the file I/O operation to reference the destination file comprising the portion of the result and the another destination file comprising the remaining result, wherein the result of the file I/O operation located at the destination file and the another destination file is accessible through the single file handle.

16. The computer program product according to claim 15, the computer program product further comprising:

program instructions, stored on at least one of the one or more storage devices, in response to initiating performance of the file I/O operation to store the result of the file I/O operation in the destination file, to listen for a user event within an interface displaying a progress of the file I/O operation, wherein the interface is enabled to receive user input of a location for the another destination file; and program instructions, stored on at least one of the one or more storage devices, in response to detecting a user event within the interface of the user specifying the location for the another destination file while the file I/O operation is in progress, to set the location set by the user in the user event as the location for the another destination file.

17. The computer program product according to claim 15, the computer program product further comprising:

program instructions, stored on at least one of the one or more storage devices, in response to initiating performance of the file I/O operation to store the result of the file I/O operation in the destination file, to display a selectable option for the user to select to specify the another destination file within a window displaying the amount of the file I/O operation currently completed.

18. The computer program product according to claim 15, the computer program product further comprising:

program instructions, stored on at least one of the one or more storage devices, to perform a file I/O operation for performing a data compression process on a file to reduce a size of the file with the result of the data compression process stored as the destination file.

* * * * *